No. 740,343. PATENTED SEPT. 29, 1903.
M. F. WERNER.
ANIMAL TRAP.
APPLICATION FILED NOV. 22, 1902.
NO MODEL.

Witnesses:
F. L. Ourand.
Frank G. Radelfinger.

Inventor:
Max F. Werner,
by Louis Bagger & Co
Attorneys.

No. 740,343. Patented September 29, 1903.

UNITED STATES PATENT OFFICE.

MAX F. WERNER, OF MENDOTA, WISCONSIN.

ANIMAL-TRAP.

SPECIFICATION forming part of Letters Patent No. 740,343, dated September 29, 1903.

Application filed November 22, 1902. Serial No. 132,451. (No model.)

*To all whom it may concern:*

Be it known that I, MAX F. WERNER, a citizen of the United States, residing at Mendota, in the county of Dane and State of Wisconsin, have invented new and useful Improvements in Animal-Traps, of which the following is a specification.

My invention relates to animal-traps; and the object of the same is to construct a trap which can be set within the holes of burrowing animals to catch them in attempting to come out.

The simple and novel construction employed by me in carrying out my invention is fully described and claimed in this specification and illustrated in the accompanying drawings, forming a part thereof, in which—

Figure 1:
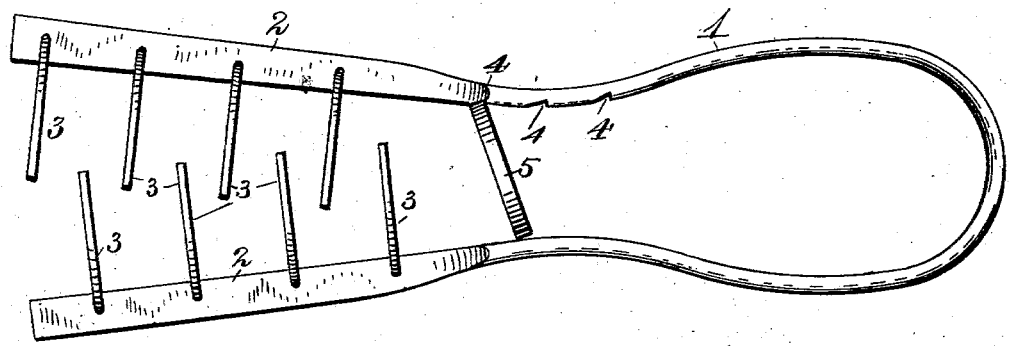
Figure 3:
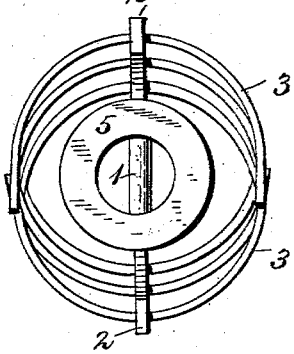
Figure 2:
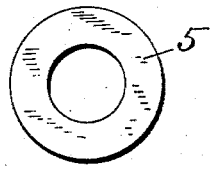

Figure 1 is a side elevation of my trap set. Fig. 2 is a detail of the trigger-disk. Fig. 3 is an end elevation looking into the open jaws.

Like numerals of reference designate like parts in the different views of the drawings.

The numeral 1 designates a U-shaped member formed of stiff resilient round wire. The arms 2 of the member 1 are not normally parallel, but converge slightly to form grasping-jaws. A series of intermeshing curved teeth 3 are mounted on the jaws 2 and extend at right angles to the jaws to embrace and hold objects coming between the jaws 2. Shallow notches 4 are formed in one of the jaws 2 above the teeth 3, and a circular disk 5 is provided, which is designed to serve as a trigger for the trap.

In setting my trap the jaws 2 are forced apart with one hand and the disk 5 inserted between them with the edge engaging one of the notches 4 and the diametrically opposite point on the edge engaging the other jaw 2. The jaws 2 are then forced apart by sliding the disk forward until it stands alone in the position shown in Fig. 1 and holds the jaws 2 apart. The trap is then inserted in the hole, and the animal in attempting to pass out will enter the jaws 2, spring the trap by displacing the trigger-disk and releasing the jaws. It should be noted that the form of the disk 5 renders it a very sensitive trigger, especially when used in combination with the round jaw members.

I do not wish to be limited as to details of construction, as these may be modified in many particulars without departing from the spirit of my invention.

Having thus described my invention, what I claim as new, and desire to secure by Letters Patent, is—

1. In a trap, the combination of a resilient U-shaped member, the arms of which serve as jaws, a plurality of semicircular teeth located at intervals along said arms, one of said arms having a plurality of beveled notches therein, and a circular disk adapted to engage one of said notches and thereby set obliquely to said arms to serve as a trigger, substantially as described.

2. In a trap, the combination of a resilient V-shaped member, the arms of which serve as grasping-jaws and one of which arms has a beveled notch therein, and a circular disk adapted to engage said notch and thereby set obliquely to said arms to serve as a trigger, substantially as described.

In testimony whereof I have hereunto set my hand in presence of two subscribing witnesses.

MAX F. WERNER.

Witnesses:
CHRIS. K. TENNEY,
MAHALA A. MASON.